May 6, 1952 D. J. BAKER 2,595,561

PHONOGRAPH PICKUP WITH SHOCK-PROOF MOUNTING

Filed April 8, 1949 2 SHEETS—SHEET 1

INVENTOR.
DONALD J. BAKER

BY Ralph B. Stewart

ATTORNEY

INVENTOR.
DONALD J. BAKER
BY
Ralph B. Stewart
ATTORNEY

Patented May 6, 1952

2,595,561

UNITED STATES PATENT OFFICE 2,595,561

PHONOGRAPH PICKUP WITH SHOCK-PROOF MOUNTING

Donald J. Baker, Los Angeles, Calif.

Application April 8, 1949, Serial No. 86,318

8 Claims. (Cl. 179—100.41)

The invention relates to pick-up heads useful in recording and reproducing sound.

One object of the present invention is to devise a shock-proof mounting for a pick-up head, to avoid injury to the stylus and other parts upon accidental dropping of the head.

A further object of the invention is to devise an improved pick-up head of the magnetic type.

Still another object is to devise an improved form of stylus to eliminate distortion due to vertical or axial thrust on the stylus. My improved stylus is especially useful in overcoming the distortion due to the "pinch" effect.

The preferred form of the shock-proof mounting embodied in my invention and two different forms of magnetic armature are illustrated by the accompanying drawings in which.

Figure 1:
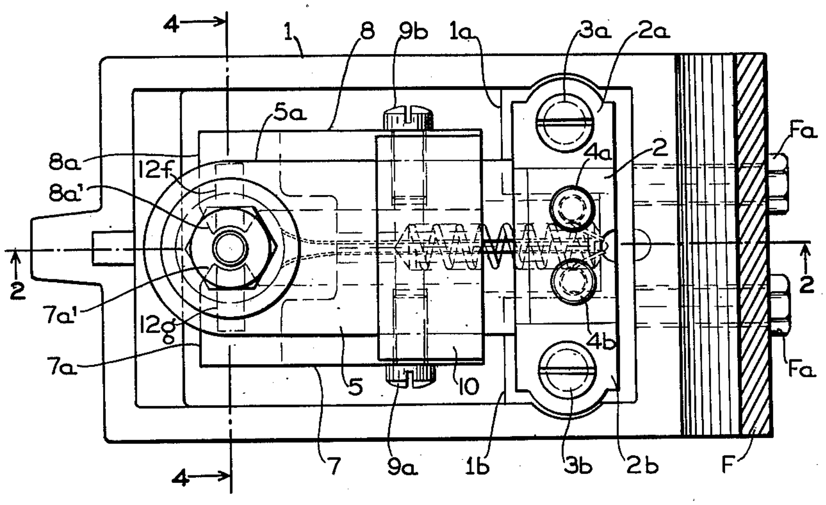
Figure 1 is a top plan view of a pick-up head according to my invention with the top cover of the casing removed.

Referring to the drawing, the pick-up unit is mounted within a suitable casing 1 which preferably is formed of insulating material such as molded plastic. Only the lower portion of the casing is shown on the drawing, the upper portion serving as a cover. The casing 1 is secured to a vertical flange F by suitable screws Fa, the flange F being carried by a horizontally extending tone arm not shown. In the two rear corners of the casing 1 are two bosses 1a and 1b formed integrally with the casing and serving as a support for a mounting block 2 positioned between the bosses and having oppositely extending arms 2a and 2b seated on the bosses and being secured thereto by suitable screws 3a and 3b. The block 2 is formed of non-magnetic metal, and a pair of terminal posts 4a and 4b for the pick-up coil are mounted on top of the block.

The pick-up unit proper is formed of a vertically arranged metallic member 5, formed of non-magnetic metal, such as aluminum, and is provided with a forwardly extending arm 5a at the upper end thereof and a rearwardly extending arm 5b at the lower end thereof. The lower end of mounting block 2 is bifurcated, and the arm 5b extends into the opening of the bifurcated end and is pivoted thereto by a suitable pin 6. The block 5 is provided on opposite sides with rearwardly extending bosses 5c which engage the front faces of the legs of the lower end of the block 2 and act as stops to prevent the pick-up unit from tilting below the position shown in Figure 2. A pair of soft iron pole pieces 7 and 8 are secured to opposite side faces of block 5 by means of suitable screws 9a and 9b, and an inverted U-shaped magnet 10 is mounted upon the upper end of these pole pieces and is positioned immediately behind the block 5. Pole pieces 7 and 8 are provided with forwardly extending polar extensions 7a and 8a, which carry inwardly directed pole tip portions 7a' and 8a' as shown in Figure 1. These pole tip portions are spaced apart to form an air-gap in which the magnetic armature is positioned.

Figures 2, 7:
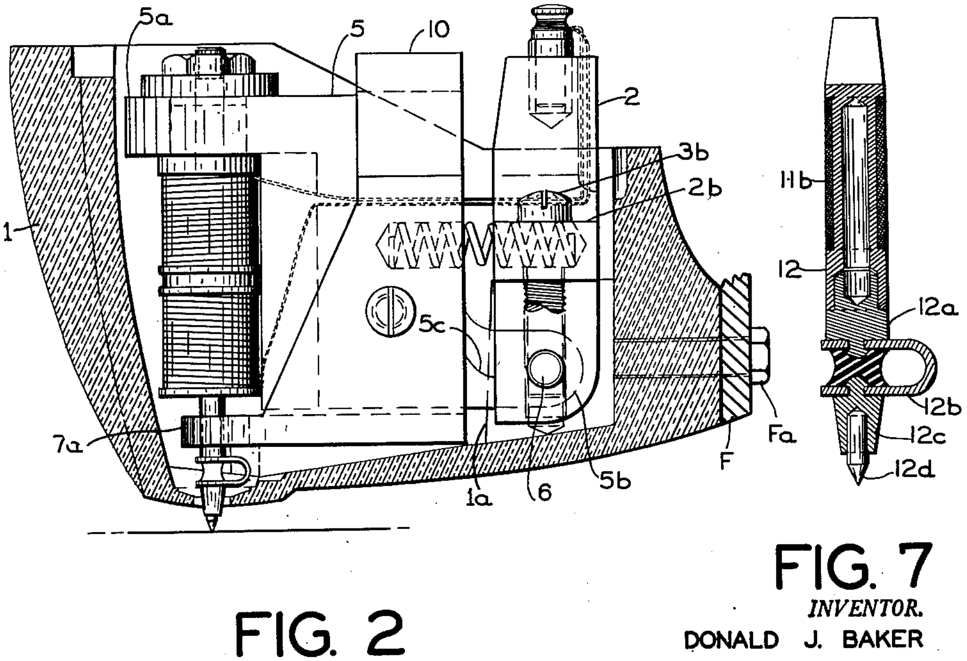
Figure 2 is a side view of the pick-up head shown in Figure 1 with the casing shown in section along the cutting plane 2—2 in Figure 1.
Figure 7 is an enlarged sectional view of the lower end portion of Figure 6.
Figure 3:
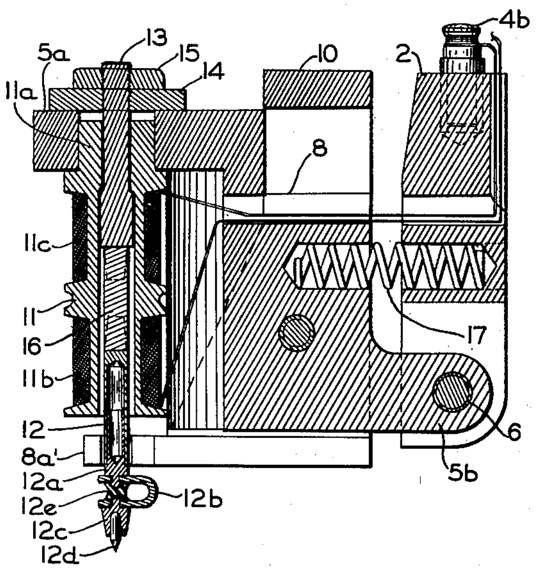
Figure 3 is a sectional view of the pick-up head taken along the cutting plane 2—2 of Figure 1.
Figure 4:
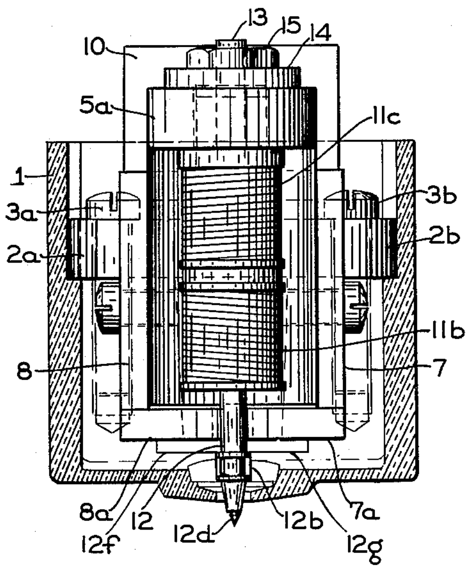
Figure 4 is a front view of the pick-up head shown in Figure 1 with the casing shown in section along the plane 4—4 of Figure 1.

The pick-up coil is supported by the arm 5a and is located beneath this arm. In Figures 1-4, the pick-up coil is formed of two sections wound upon a double spool 11, having a stem 11a at the upper end thereof extending into a bore formed in the arm 5a coaxially with the gap between the pole tip portions 7a' and 8a'. The two sections of the pick-up coil are shown at 11b and 11c. A magnetic armature 12 is positioned within the lower end of the spool 11 and extends through the gap formed between pole tip portions 7a' and 8a'. The armature is supported by means of a mounting stem 13 positioned in the upper end of the spool 11 and having its upper end extending through a washer 14 and carrying a securing nut 15. As shown in Figure 3, the stem 13 has an enlarged portion engaging an internal shoulder on the spool 11, whereby the nut 15 serves to clamp the spool 11 in position on the arm 5a. The lower end of the stem 13 is slotted in the plane of the line 2—2 of Figure 1, and the upper end of the armature 12 also is slotted in the same plane and the armature is secured to stem 13 by means of a flat, resilient, reed-like piece 16, which may be formed of spring steel or Phosphor bronze. The piece 16 forms a flexible support for the upper end of the armature 12 permitting the armature to move freely transversely of the plane 2—2, while holding the armature against appreciable movement within this plane.

The armature 12 preferably is formed of a round magnetic piece having a bore in the lower end thereof for receiving the upper end of a plug 12a, preferably formed of light metal such as aluminum. One arm of a U-shaped spring member 12b is riveted or otherwise secured to the lower end of the plug 12a, and the other arm of spring 12b carries a stylus mounting portion 12c arranged in alignment with the armature 12. A suitable stylus or needle 12d is mounted in the piece 12c in axial alignment with the armature 12. The space between the ends of the arms of the spring 12b is filled with a suitable vibration damping material 12e as will be explained later.

Figure 5:
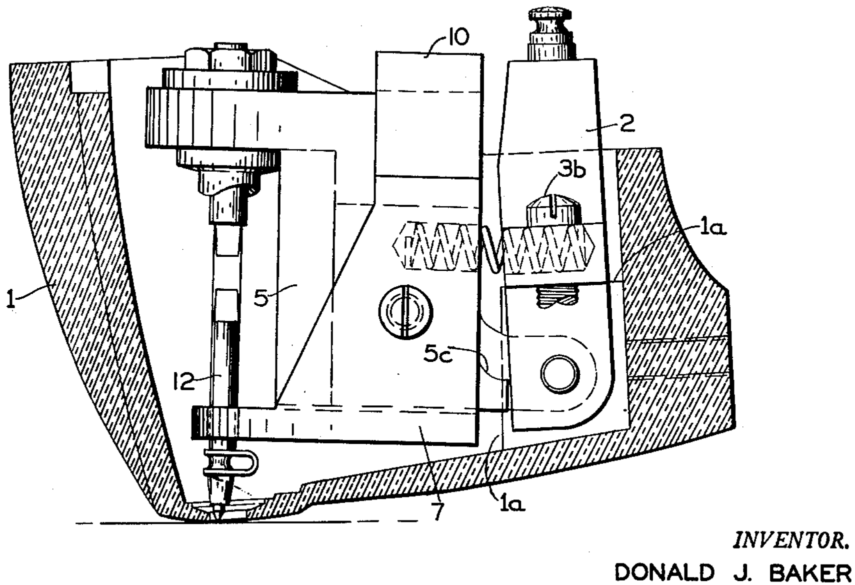
Figure 5 is a view similar to Figure 2, but showing the pick-up in a position with the casing in contact with the record.

A compression spring 17 is mounted with the opposite ends thereof positioned with aligned bores formed in blocks 2 and 5 as shown in Figure 3. This spring normally exerts a pressure on the block 5 sufficient to hold the bosses 5c in engagement with the block 2 under normal operating conditions. In other words, under normal operating conditions, the unbalanced weight of the pick-up arm and head is carried by the stylus when it engages the surface of the record as shown in Figure 2 and this weight is insufficient to overcome the force of spring 17. In case the pick-up is dropped upon the surface of the record or any other surface, the force on the end of the stylus is greatly increased and when it becomes sufficient to overcome the force of spring 17, the pick-up unit will rotate around its pivotal axis 6 and permit the casing 1 to move into engagement with the record surface as shown in Figure 5. Thus, the arrangement provides a yielding mounting for the pick-up which prevents damage to the stylus and armature in case the pressure on the stylus exceeds a predetermined amount. The pick-up casing serves as a guard to relieve the stylus of any pressure above that necessary to compress the spring 17.

The two sections 11b and 11c of the pick-up coil are connected in series and connected to terminal posts 4a and 4b mounted on block 2. The magnetic armature 12 is normally positioned substantially midway between the pole tip portions 7a' and 8a' and the armature carries very little flux. Upon being deflected to one side or the other of its normal position, the armature will conduct flux of one polarity or the other into the pick-up coil and will thereby generate a voltage in the coil, as will be understood by those skilled in the art.

The U-shaped spring member 12b provides a substantially rigid connection between the armature 12 and the stylus block 12c for transmission of lateral vibration to the armature, but it presents substantial compliance to any vibration transmitted axially of the armature. Also, the damping material 12e connecting the outer ends of the spring member 12b serves to damp out any resonance effects which might be produced by the spring member 12b, and at the same time the damping material 12e does not transmit any substantial amount of vertical vibrations to the armature 12. The rising and falling of the stylus in the groove due to the "pinch" effect is absorbed by the compressible damping material 12e and very little of this motion is transmitted to the armature 12. The spring member 12b acts somewhat as a hinge permitting the stylus to swing about a horizontal axis located approximately at the middle of the loop portion. When the record is moving from right to left in Figure 2, the "pinch" effect will cause the stylus to oscillate slightly about this axis, involving both a vertical component of movement and a horizontal component due to the drag of the stylus on the record.

Two strips of damping material 12f and 12g, such as highly plasticized cellulose nitrate, are secured to the lower faces of pole tips 7a' and 8a' on opposite sides of armature 12 and have their inner ends secured to the armature. These strips normally center the armature in the air-gap and also serve to damp out any resonance effects in the armature.

Figure 6:
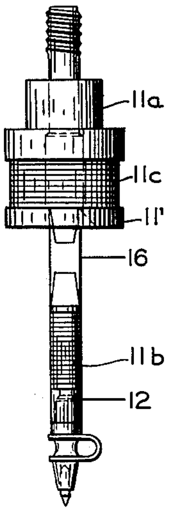
Figure 6 is a side elevational view of a modified form of magnetic armature.

In Figures 6 and 7, I have shown a second form of magnetic armature which may be used in my improved pick-up head. In this arrangement, the pick-up coil section 11b is wound in a shallow circular groove on the magnetic armature 12, and the coil section 11c is wound upon the short spool 11', see Figure 6. Except for the shallow groove providing the winding space for coil section 11b, the magnetic armature of Figures 6 and 7 is generally the same as that shown in Figure 3. The two coil sections 11b and 11c are connected in series as explained above in connection with Figure 3, and the operation would be substantially the same as Figure 3, except that coil section 11b vibrates with the armature, and the variation in flux passing through the armature will be more effective in inducing a voltage in the coil section.

The damping material 12e located between the arms of the U-shaped spring 12b preferably is formed of a highly plasticized cellulose nitrate, and this material is applied by placing a drop of the material in liquid form between the ends of the spring member and allowing the material to dry in position. U-shaped spring 12b may be formed of beryllium-copper or other suitable spring material.

I claim:

1. A mounting for a pick-up head comprising, in combination, a casing means for rigidly securing said casing to a tone arm, a lower wall in said casing having a stylus opening therein, a pick-up unit completely enclosed within said casing and means for pivotally mounting said pick-up unit on a horizontal axis within said casing and having a stylus positioned to project through said opening, a stop for limiting the pivotal movement of said casing and thereby limiting the projection of the stylus through said opening, a compression spring, means whereby said compression spring normally urges said pick-up head against said stop with sufficient force only to hold said head against said stop and to prevent reverse movement of said pick-up head under the unbalanced weight applied to the stylus from the tone arm, the casing and the pick-up head, whereby any excess reactive force exerted on the stylus will force the stylus back into said casing.

2. A pick-up head comprising a vertically arranged block having a forwardly extending arm at the upper end thereof and a rearwardly extending arm at the lower end thereof, means pivotally mounting said rearwardly extending arm on a horizontal axis, a spring member, means whereby said spring member normally urges the upper end of said block in a forward direction, stop means for limiting the rotation of said block about said horizontal axis, a pair of magnetic pole pieces, means for securing said pole pieces to said block on opposite sides thereof, said pole pieces having forwardly extending polar extensions at the lower end of said block and terminating in inwardly extended pole tips spaced apart to provide an air-gap, a magnet, means whereby said magnet is arranged transversely of said pole pieces and having opposite poles connected to said pole pieces, a magnetic armature, means for suspending said armature from said forwardly extending arm and in a position to project through said air-gap, and a pick-up coil surrounding a magnetic path in which the flux is varied by movement of said armature.

3. A pick-up head comprising a vertically arranged block having a forwardly extending arm at the upper end thereof, a pair of magnetic pole pieces, means for securing said pole pieces to said block on opposite sides thereof, said pole pieces having forwardly extending polar extensions at the lower end of said block and terminating in inwardly extended pole tips spaced apart to provide an air-gap, a magnet, means whereby said magnet is arranged transversely of said pole pieces, said magnet having opposite poles connected to said pole pieces, a magnetic armature, means for suspending said armature from said forwardly extending arm and projecting through said air-gap, and a pick-up coil surrounding a magnetic path in which the flux is varied by movement of said armature.

4. A pick-up head according to claim 3 wherein said pick-up coil is wound upon a spool supported by said forwardly extending arm in axial alignment with said air-gap and surrounds a portion of said armature.

5. A pick-up head according to claim 3 wherein a portion of said pick-up coil is wound upon a spool carried by said forwardly extending arm in axial alignment with said air-gap and another portion of said coil is wound upon said armature.

6. A pick-up head according to claim 3 and including a U-shaped spring member having two arms the end portion of one arm thereof being secured to the end of said armature, a stylus, means for securing said stylus to the other arm of said spring in alignment with said armature, and plastic damping material interposed between the arms of said spring.

7. A stylus mounting comprising a U-shaped spring member having two arms, means securing said stylus to one arm of said spring in the plane of the spring and extending outwardly from said arm at right angles thereto, an armature, means for securing said armature to the other arm of said spring in alignment with said stylus and extending outwardly from said spring, and plastic damping material joining said arms in the gap between said stylus and said armature.

8. A stylus mounting according to claim 7 wherein said spring is formed of relatively thin reed-like material bent into U-shape.

DONALD J. BAKER.

REFERENCES CITED

The following references are of record in the file of this patent:

UNITED STATES PATENTS

| Number | Name | Date |
|---|---|---|
| 1,205,915 | Mayer | Nov. 12, 1916 |
| 2,347,347 | Yenzer | Apr. 25, 1944 |
| 2,444,218 | Carnahan | June 29, 1948 |
| 2,455,913 | Bauer | Dec. 14, 1948 |
| 2,534,725 | Miller | Dec. 19, 1950 |